(12) United States Patent
Smith

(10) Patent No.: US 8,074,608 B1
(45) Date of Patent: Dec. 13, 2011

(54) CAT CLIMBING APPARATUS

(76) Inventor: David L. Smith, Henderson, NV (US)

( * ) Notice: Subject to any disclaimer, the term of this patent is extended or adjusted under 35 U.S.C. 154(b) by 36 days.

(21) Appl. No.: 12/796,768

(22) Filed: Jun. 9, 2010

(51) Int. Cl.
*A01K 15/02* (2006.01)

(52) U.S. Cl. ........................................... 119/706

(58) Field of Classification Search .......... 119/656–660, 119/706, 702
See application file for complete search history.

(56) References Cited

U.S. PATENT DOCUMENTS

| | | | |
|---|---|---|---|
| 5,002,012 A * | 3/1991 | Pierrot | 119/28.5 |
| 5,067,440 A | 11/1991 | Hatten et al. | |
| 6,343,569 B1 | 2/2002 | Buendiger | |
| 6,490,997 B1 * | 12/2002 | Biermann et al. | 119/706 |
| D501,064 S | 1/2005 | Williams | |
| 7,207,293 B2 | 4/2007 | Deming, Jr. | |
| 2002/0179021 A1 * | 12/2002 | DeRaspe-Bolles et al. | 119/706 |
| 2002/0189549 A1 | 12/2002 | Writer et al. | |
| 2010/0154719 A1 * | 6/2010 | Kellogg et al. | 119/706 |

FOREIGN PATENT DOCUMENTS

JP 2005110580 A * 4/2005

* cited by examiner

*Primary Examiner* — David Parsley
*Assistant Examiner* — Danielle Clerkley
(74) *Attorney, Agent, or Firm* — Crossley Patent Law; Mark A. Crossley

(57) ABSTRACT

The cat climbing apparatus provides for cats to scratch, stretch, climb, and position themselves at an elevated height. The sturdiness of the apparatus mounting brackets insures cat use, as cats hesitate or simply refuse to use scratching and climbing posts that are not sturdily anchored, one reason why cats often choose furniture over poorly designed cat implements. The apparatus provides for a user to arrange tubes, angles, and at least one platform as desired, thereby best fitting spaces available as well as providing aesthetic appeal and cat intrigue. The rope wrap of the tubes is durable and inviting to a cat.

10 Claims, 3 Drawing Sheets

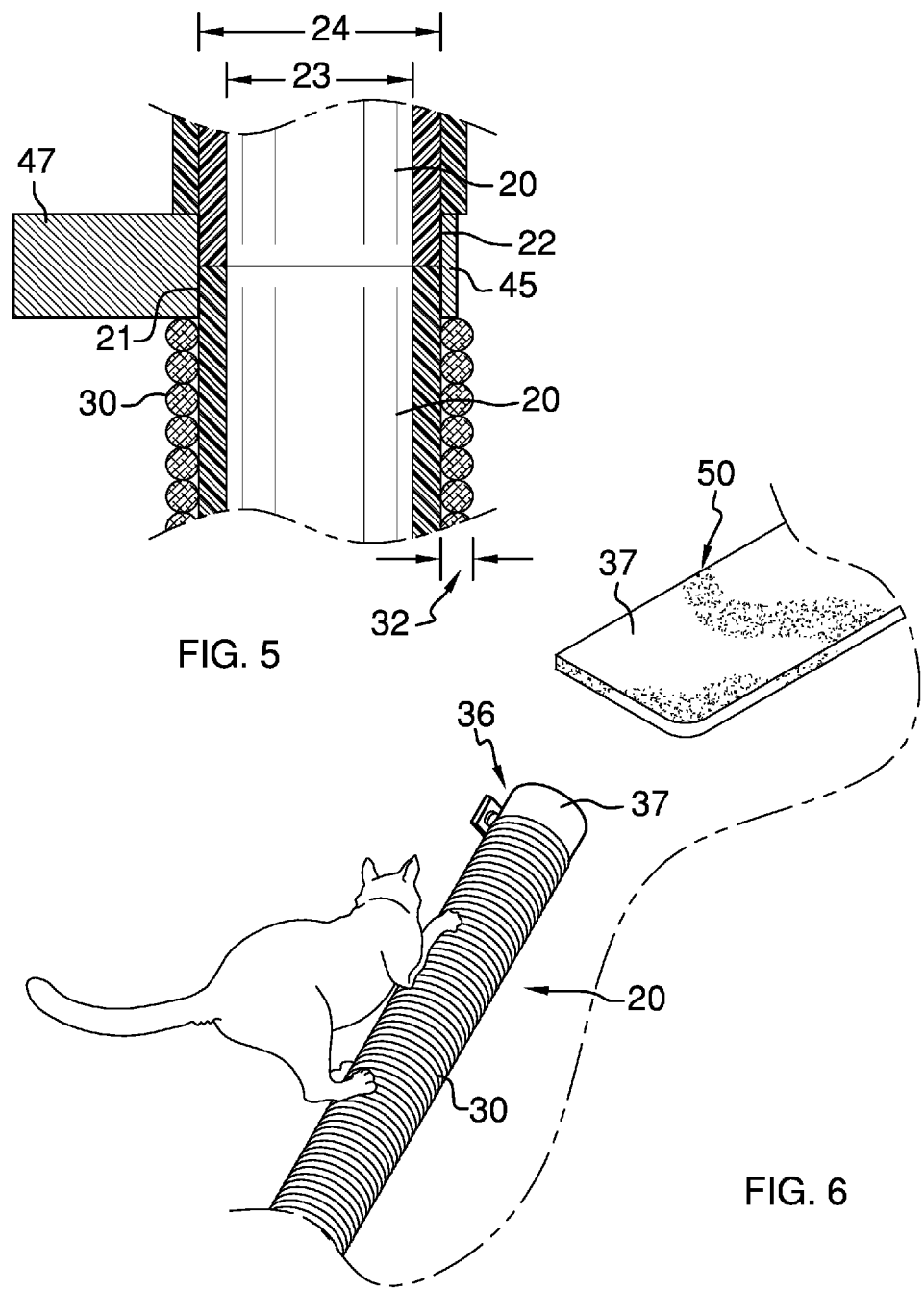

CAT CLIMBING APPARATUS

BACKGROUND OF THE INVENTION

Those who have lived with cats that have not been declawed are fully aware of the hazard presented to home indoors by same. While many devices have been proposed for alleviating the problems of having a cat indoors and also for aiding a cat in a healthy life, few provide even the basics for such. For example, cats need a scratching post that allows them to fully accommodate the cat's fully extended body. A cat also demands a scratching post that is extremely stable. Having a large based scratching device for stability is not always best because sufficient space is not always available. A further disadvantage of a large base is that it must be moved during housecleaning. A room's aesthetics are also subject to concern. Cats also have the desire to view their world from an elevated position, so a proper cat indoor device should provide for a cat's choice in achieving a relatively high altitude. Additionally, modularity provides for replacement of various parts—a design concern not always considered.

FIELD OF THE INVENTION

The cat climbing apparatus relates to a combined feline care and home protection devices and more especially to a cat climbing apparatus that provides for cats to scratch, stretch, climb, and position themselves at an elevated height.

SUMMARY OF THE INVENTION

The general purpose of the cat climbing apparatus, described subsequently in greater detail, is to provide a cat climbing apparatus which has many novel features that result in an improved cat climbing apparatus which is not anticipated, rendered obvious, suggested, or even implied by prior art, either alone or in combination thereof.

To attain this, the cat climbing apparatus provides for cats to scratch, stretch, climb, and position themselves at an elevated height. The sturdiness of the apparatus mounting brackets insures cat use, as cats hesitate or simply refuse to use scratching and climbing posts that are not sturdily anchored, one reason why cats often choose furniture over poorly designed cat implements. The apparatus provides for a user to arrange tubes, angles, and at least one platform as desired, thereby best fitting spaces available as well as providing aesthetic appeal and cat intrigue. The rope wrap of the tubes is durable and inviting to a cat.

Importantly, experimentally derived dimensions of the tubes find that about 3 inch OD (outside diameter) is best suited to the felines, with ½ inch wall thickness being best, when cardboard type tube, thereby providing about 2½ inch ID (internal diameter). Lesser wall thicknesses may be employed dependent upon the tube material chosen. Rope diameter may ideally be ⅜ inch but may also be provided in other diameters.

Thus has been broadly outlined the more important features of the improved cat climbing apparatus so that the detailed description thereof that follows may be better understood and in order that the present contribution to the art may be better appreciated.

An object of the cat climbing apparatus is to provide for a cat's health and welfare.

Another object of the cat climbing apparatus is to provide sufficient length for a cat to fully stretch.

A further object of the cat climbing apparatus is to provide a cat scratch post.

An added object of the cat climbing apparatus is to provide for a cat to selectively establish an elevated height position.

And, an object of the cat climbing apparatus is to provide for a desired apparatus configuration.

Still another object of the cat climbing apparatus is to provide a sturdy structure.

These together with additional objects, features and advantages of the improved cat climbing apparatus will be readily apparent to those of ordinary skill in the art upon reading the following detailed description of presently preferred, but nonetheless illustrative, embodiments of the improved cat climbing apparatus when taken in conjunction with the accompanying drawings.

In this respect, before explaining the current embodiments of the improved cat climbing apparatus in detail, it is to be understood that the cat climbing apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved cat climbing apparatus. It is therefore important that the claims be regarded as including such equivalent constructions insofar as they do not depart from the spirit and scope of the cat climbing apparatus. It is also to be understood that the phraseology and terminology employed herein are for purposes of description and should not be regarded as limiting.

BRIEF DESCRIPTION OF THE DRAWINGS

FIG. 5 is a partial cross sectional view of FIG. 4, taken along the line 5-5.

FIG. 6 is a perspective view of a tube and platform in use.

DETAILED DESCRIPTION OF THE DRAWINGS

With reference now to the drawings, and in particular FIGS. 1 through 6 thereof, the principles and concepts of the cat climbing apparatus generally designated by the reference number 10 will be described.

Figure 1:
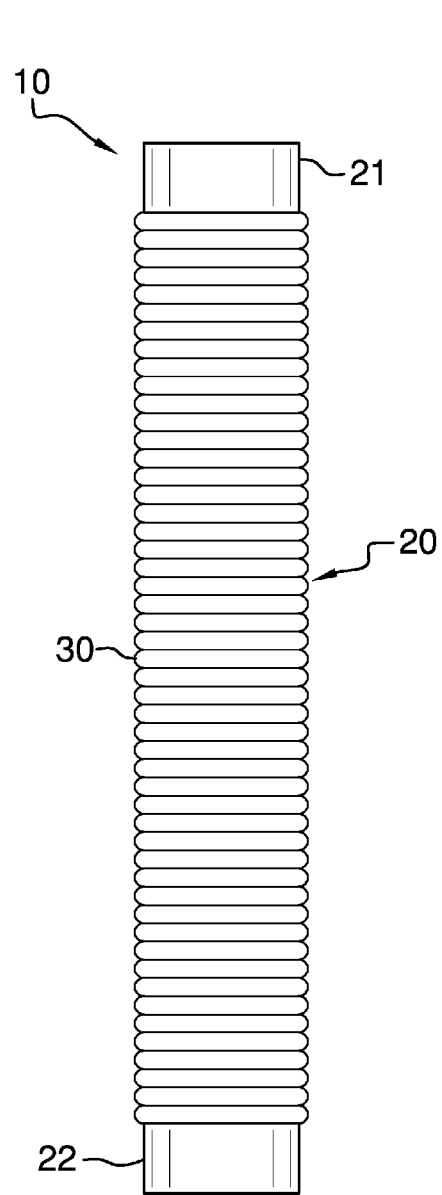
FIG. 1 is a lateral elevation view of one tube.

Referring to FIG. 1, the apparatus 10 partially comprises at least two tubes 20. Each tube 20 has a first unwrapped end 21 spaced apart from a second unwrapped end 22.

Referring to FIG. 5, each tube 20 has an ID (inside diameter) 23 of preferably about 2½ inches, and an OD (outside diameter) 24 of preferably about 3 inches. The rope 30 is continuously wound around each tube 20 from the first unwrapped end 21 to the second unwrapped end 22. The rope 30 has a rope diameter 32 of about ⅜".

Referring to FIG. 6, the apparatus 10 further comprises a plurality of caps 36. Each cap 36 is selectively disposed on any unwrapped end of any tube 20. A cover 37 covers each cap 36. Each cover 37 is partially penetrable by a cat's claws.

Figure 4:
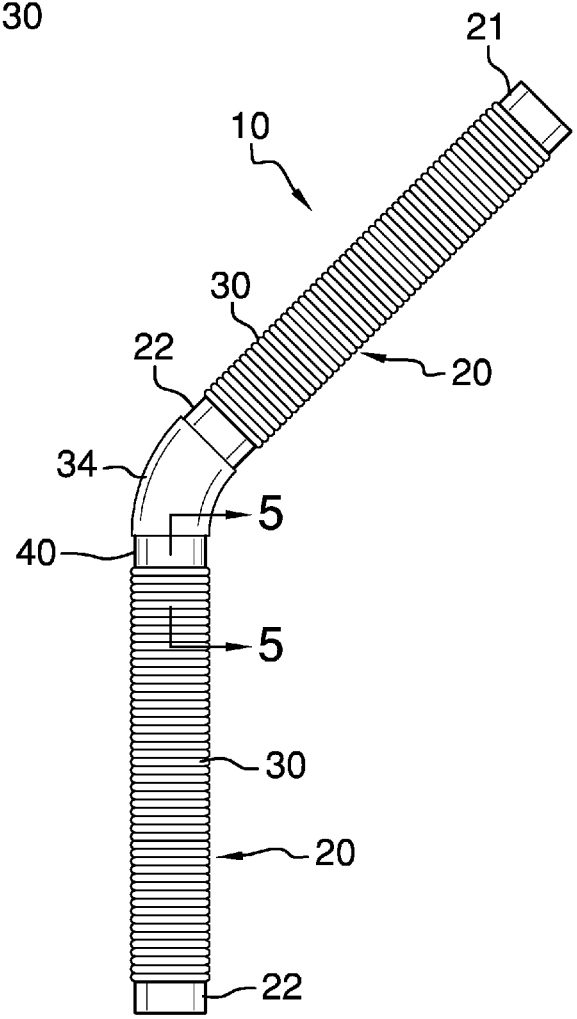
FIG. 4 is a lateral elevation view of two tubes joined by a joint.

Referring to FIG. 4, at least one female joint 34 is provided. The joint 34 selectively joins any one tube 20 to another tube 20. The female joint 34 is snugly fitted to the OD 24 of each chosen tube 20.

Figure 2:
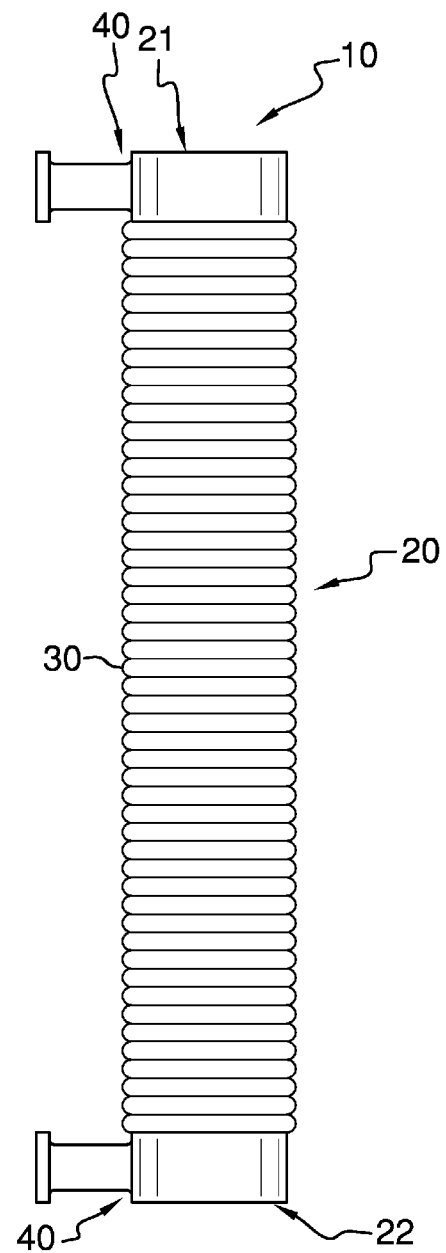
FIG. 2 is a lateral elevation view of one tube with two mounting brackets.
Figure 3:
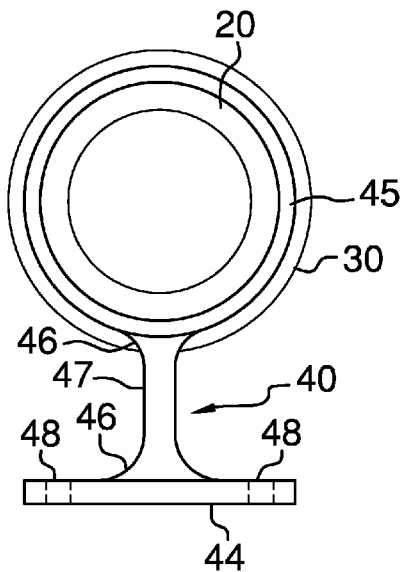
FIG. 3 is a top plan view of a tube with mounting bracket.

Referring to FIGS. 2 and 3, a plurality of mounting brackets 40 is provided. Each mounting bracket 40 comprises a rectangular plate 44 having at least a pair of spaced apart orifices 48 disposed in each plate 44. Each mounting bracket 40 further comprises a tube surround 45. The tube surround 45 snugly and selectively fits to any tube 20 unwrapped end. A beveled connection 46 extends outwardly and perpendicularly from each of the plate 44 and the tube surround 45. An extension 47 joins the beveled connections 46. The beveled connections 46 importantly provide several benefits, including strength in the extensions 47 connections to the tube surround 45 and the plate 44, aesthetics, and also injury prevention for cats.

Referring again to FIG. 6, at least one platform 50 is provided and is selectively affixed to a wall in proximity to at least one of the tubes 20. Platforms 50 provide for a cat's need to locate in a height elevated position.

Joints 34 are provided in a plurality of angles such that a user can design the assembled apparatus 10 as desired, determining overall length, direction, and shapes. Female joints 34 are provided in 30 degrees, 45 degrees, 90 degrees, and in straight sections.

With respect to the above description then, it is to be realized that the optimum dimensional relationships for the parts of the cat climbing apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the cat climbing apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the cat climbing apparatus may be used.

Therefore, the foregoing is considered as illustrative only of the principles of the cat climbing apparatus. Further, since numerous modifications and changes will readily occur to those skilled in the art, it is not desired to limit the cat climbing apparatus to the exact construction and operation shown and described, and accordingly, all suitable modifications and equivalents may be resorted to, falling within the scope of the cat climbing apparatus.

What is claimed is:

1. A cat climbing apparatus comprising, in combination:
   at least two tubes, each tube having a first unwrapped end spaced apart from a second unwrapped end, each tube having an ID and an OD,
   a rope continuously wound around each tube from the first unwrapped end to the second unwrapped end;
   a plurality of caps, each cap selectively disposed on any unwrapped end of any tube;
   a cover covering each cap, each cover partially penetrable by a cat's claws;
   at least one female joint, said joint selectively joining any one tube to another tube, said female joint snugly fitting the OD of each tube;
   a plurality of mounting brackets, each mounting bracket comprising:
      a rectangular plate;
      at least a pair of spaced apart orifices disposed in each plate;
      a tube surround, the tube surround snugly and selectively fitted to any tube unwrapped end;
      a beveled connection extended outwardly and perpendicularly from each of the plate and the tube surround;
      an extension joining the beveled connections;
   a platform selectively affixed to a wall in proximity to at least one of the tubes.

2. The apparatus according to claim 1 wherein the joint further comprises a 30 degree joint.

3. The apparatus according to claim 1 wherein the joint further comprises a 45 degree joint.

4. The apparatus according to claim 1 wherein the joint further comprises a 90 degree joint.

5. The apparatus according to claim 1 wherein the joint further comprises a straight joint.

6. A cat climbing apparatus comprising, in combination:
   at least two tubes, each tube having a first unwrapped end spaced apart from a second unwrapped end, each tube having an ID of about 2½ inches and an OD of about 3 inches,
   a rope continuously wound around each tube from the first unwrapped end to the second unwrapped end, the rope having a rope diameter of about ⅜";
   a plurality of caps, each cap selectively disposed on any unwrapped end of any tube;
   a cover covering each cap, each cover partially penetrable by a cat's claws;
   at least one female joint, the joint selectively joining any one tube to another tube, the female joint snugly fitting the OD of each tube;
   a plurality of mounting brackets, each mounting bracket comprising:
      a rectangular plate;
      at least a pair of spaced apart orifices disposed in each plate;
      a tube surround, the tube surround snugly and selectively fitted to any tube unwrapped end;
      a beveled connection extended outwardly and perpendicularly from each of the plate and the tube surround;
      an extension joining the beveled connections;
   a platform selectively affixed to a wall in proximity to at least one of the tubes.

7. The apparatus according to claim 6 wherein the joint further comprises a 30 degree joint.

8. The apparatus according to claim 6 wherein the joint further comprises a 45 degree joint.

9. The apparatus according to claim 6 wherein the joint further comprises a 90 degree joint.

10. The apparatus according to claim 6 wherein the joint further comprises a straight joint.

* * * * *